(12) United States Patent
Shoari et al.

(10) Patent No.: US 10,916,118 B2
(45) Date of Patent: *Feb. 9, 2021

(54) APPARATUS AND METHOD FOR ROBUST INDOOR/OUTDOOR OBJECT LOCALIZATION AND TRACKING USING MULTIPLE ANTENNAS TECHNIQUE

(71) Applicants: Arian Shoari, San Diego, CA (US); Mona Komeijani, San Diego, CA (US)

(72) Inventors: Arian Shoari, San Diego, CA (US); Mona Komeijani, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,921

(22) Filed: Jan. 2, 2019

(65) Prior Publication Data

US 2020/0211359 A1 Jul. 2, 2020

Related U.S. Application Data

(63) Continuation-in-part of application No. 15/396,493, filed on Dec. 13, 2016, now Pat. No. 10,186,139.

(60) Provisional application No. 62/304,944, filed on Mar. 8, 2016, provisional application No. 62/321,906, filed on Apr. 13, 2016.

(51) Int. Cl.
| | |
|---|---|
| *G08B 21/24* | (2006.01) |
| *H04B 17/327* | (2015.01) |
| *H04B 7/10* | (2017.01) |
| *G01S 5/04* | (2006.01) |
| *H04B 7/06* | (2006.01) |

(52) U.S. Cl.
CPC ............ *G08B 21/24* (2013.01); *G01S 5/04* (2013.01); *H04B 7/0617* (2013.01); *H04B 7/10* (2013.01); *H04B 17/327* (2015.01)

(58) Field of Classification Search
CPC .... G08B 21/24; H04B 17/327; H04B 7/0617; H04B 7/10; G01S 5/04
See application file for complete search history.

(56) References Cited

U.S. PATENT DOCUMENTS

| | | | |
|---|---|---|---|
| 7,652,577 B1 * | 1/2010 | Madhow | G06K 7/10346 340/572.1 |
| 9,245,433 B1 * | 1/2016 | Butler | H04W 4/029 |
| 2010/0113099 A1 * | 5/2010 | Uno | H04B 7/0408 455/562.1 |

(Continued)

*Primary Examiner* — Omer S Khan

(57) ABSTRACT

This disclosure describes novel schemes and utilities that promote sustainable usage of smartphones. It describes apparatus and methods to prevent phone loss, prevent overheating problems, decrease energy waste of the battery, prevent overcharging, decrease packaging waste, and encourage sustainable behavior among users to increase the life of the electronic product. In addition, this application characterize mechanism for localization of people and objects. The apparatus and methods may be applied to promote sustainable usage of other electronic devices such as tablets, laptops, pocket PCs, personal digital assistants (PDAs), e-readers, wearable devices, and etc. In addition, a framework has been presented which can be applied to promote sustainable behavior for any consumer electronics products including smartphones. In addition, novel localization apparatus and methods is presented in this application that can be applied for general localization/tracking purposes.

15 Claims, 13 Drawing Sheets

(56) References Cited

U.S. PATENT DOCUMENTS

| | | | |
|---|---|---|---|
| 2011/0025464 A1* | 2/2011 | Geng | G01S 5/021 340/10.1 |
| 2013/0225200 A1* | 8/2013 | Ben Hamida | G01S 5/0289 455/456.1 |
| 2014/0030982 A1* | 1/2014 | Cardona | G01S 5/14 455/67.11 |
| 2014/0073071 A1* | 3/2014 | Diorio | G06K 19/0723 438/26 |
| 2014/0347165 A1* | 11/2014 | Bremer | G06K 7/10217 340/10.1 |
| 2015/0229782 A1* | 8/2015 | Zuidema | H04M 1/7253 455/418 |

* cited by examiner

Nr is the number of receiver antennas
Mt is the number of transmitter antennas

APPARATUS AND METHOD FOR ROBUST INDOOR/OUTDOOR OBJECT LOCALIZATION AND TRACKING USING MULTIPLE ANTENNAS TECHNIQUE

CROSS REFERENCE TO RELATED APPLICATIONS

This application is a continuation in part application for U.S. Non-Provisional application Ser. No. 15/396,493 and claims the benefit of U.S. Provisional Application No. 62/304,944 filed on Mar. 8, 2016, U.S. Provisional Application No. 62/321,906 filed on Apr. 13, 2016, and U.S. Non-Provisional application Ser. No. 15/396,493 filed on Dec. 31, 2016 the contents of which are incorporated by reference herein.

STATEMENT REGARDING FEDERALLY SPONSORED RESEARCH

This invention was made with government support under CBET 1236447 awarded by National Science Foundation. The government has certain rights in the invention.

COPYRIGHT NOTICE

Some parts of the disclosure of this patent application contain materials that are subject to copyright protection. The owner of the copyright has no objection to the facsimile re-production of this disclosure by anyone as it appears in the Patent and Trademark Office Patent file or records, but otherwise reserves all (copyright or mask work) rights whatsoever.

BACKGROUND OF THE INVENTION

Market growth in consumer electronics generates a lot of environmental burdens including contamination due to scarce materials, greenhouse effect, and e-waste management challenges. Eco-design is a promising approach to reduce the environmental effect of electronics by incorporating sustainability concerns into product design process. However, most approaches do not overcome the unsustainable use such as frequently replacing a device before end of life.

Thus, the design of electronic parts and accessories play a key role in sustainable behavior for many types of products such as, but not limited to, consumer electronics, appliances, and buildings. To date, limited guidance has been developed to help designers create a product with a reduced environmental impact. However, the DWI method does not promise affecting how user thinks.

A much more effective design strategy is to incorporate sustainability concerns into product design to guarantee sustainable behavior among the users. A group of novel designs for smartphones and their accessories and packaging is presented in this application. These designs help preventing phone loss, preventing over charging of batteries, decreasing packaging waste and encouraging sustainable behavior among users. These designs can be applied to tablets, pocket PCs, PDAs, laptops, or personal digital assistants. In addition, novel localization apparatus and methods is presented in this application that can be applied for general localization/tracking purposes.

SUMMARY OF THE INVENTION

This disclosure describes novel schemes and utilities that promote sustainable usage of smartphones. It describes apparatus and methods to prevent phone loss, prevent overheating problems, decrease energy waste of the battery, prevent overcharging, decrease packaging waste, and encourage sustainable behavior among users to increase the life of the electronic product. In addition, this application characterize mechanism for localization of people and objects. The apparatus and methods may be applied to promote sustainable usage of other electronic devices such as tablets, laptops, pocket PCs, personal digital assistants (PDAs), e-readers, wearable devices, and etc. In addition, a framework has been presented which can be applied to promote sustainable behavior for any consumer electronics products including smartphones.

DETAILED DESCRIPTION

1 Designed Schemes to Reduce Energy Consumption

In this sub-section, we introduce apparatus and methods to reduce energy consumption in smartphones. This section is focused on unsustainable usage of battery. This will reduce life of a battery and decrease energy efficiency. For example, a battery used in high temperature or plugged in all day to the charger while is fully charged will have a shorter lifespan.

1.1 a New Implementation for Charger Mechanism

Figure 1:
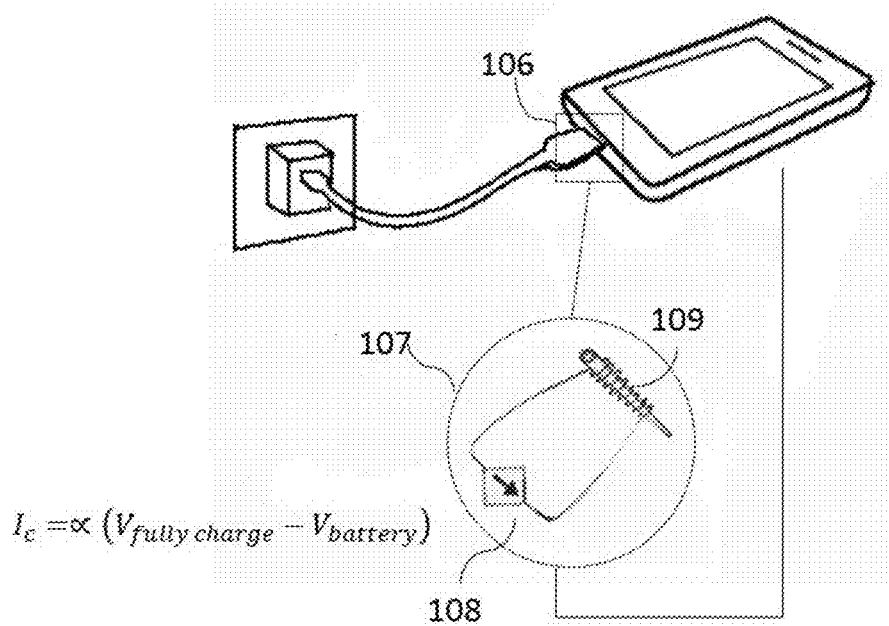
FIG. 1: A new design for charger plug in, that its attachment mechanism is controlled by an electro-magnetic field. The field weakens as the battery is charged.

To reduce energy consumption, a charger plug is designed which is slightly difficult to detach from the product while the battery is undercharged, but can be easily removed when the battery is fully charged. FIG. 1 shows a new design for charger plug in, where its attachment mechanism is controlled by an electro-magnetic field. The electromagnetic field weakens as the battery is charged. A slightly different design automatically disconnects the charging cable from the smartphone power port by making the connection loose when the battery is fully charged.

In one embodiment, the battery charger has a detachable mechanism for connection of the cord to the electric device that allow automatic disconnection of the cord when the battery is fully charged. The attachment mechanism 106 can be implemented through an electromagnet system where the current 108 (drifted from the power source and) generating the magnetic field is controlled through a feedback mechanism affected by the charged level of the battery. For example, the intensity of the magnetic field of the attachment 109 can be made proportional to the difference of the battery voltage from the full battery charge level. Alternatively, the average current controlling the electromagnetic field of the plug, might be inversely proportional to the battery voltage level such that as the battery is charged more, the connection becomes looser.

In another embodiment, the intensity of the magnetic field will be determined through changing pulse width modulation (PWM) or pulse duration modulation (PDM) of the input current based on the charged level feedback. Any or all of the following techniques including, delta modulation, delta sigma modulation, space vector modulation, direct torque control (DTC), time proportioning, or other modulation techniques may be applied for the implementation. Therefore, the design interacts with the user to promote them to a sustainable informed decision.

Figure 2:
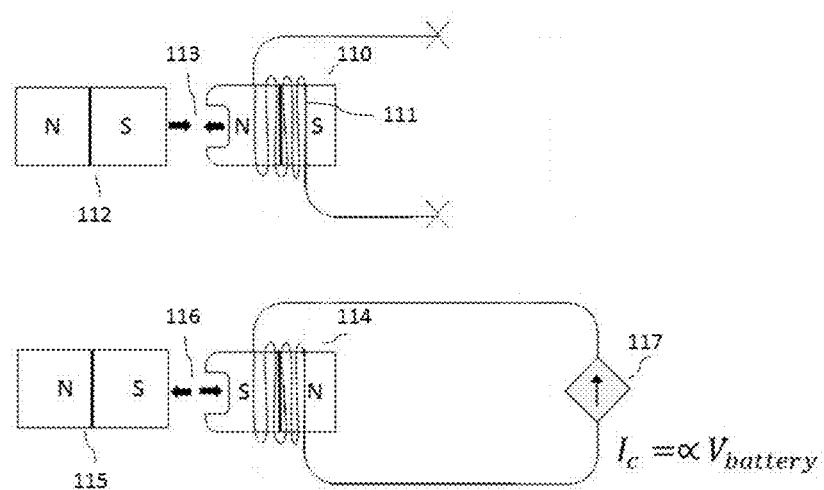
FIG. 2: A new design for charger plug in, wherein the magnetic poles reverted because of the intensity of an electromagnetic field controlled by the battery voltage.

Another implementation for charger plug in is shown in FIG. 2. In this implementation, the magnetic poles of the connectors 110, 112 initially set to attract each other 113 when the current drifted from the battery is zero 111. Then, as the battery charges, the magnetic poles of one connector reverted 110, 114 because of the intensity of an electromagnetic field controlled by the battery voltage. This could happen for example when the electromagnetic field induced by a voltage controlled current source 117 counteracts the effect of the permeant magnetic field in such a way that overall magnetic pole direction reversed 114 (South and North poles reversed in one connector). Therefore, the connectors 114, 115 repel each other 116.

In another embodiment, the feedback mechanism to control the magnetic field is provided by the output of a temperature sensor installed inside the electric device such that if the device gets hotter than a predefined temperature the plugin connector becomes detached from the device. One of the application of such implementation could be safety reasons for example to avoid battery explosion.

One skillful in the art knows that similar techniques may be used to make the design of chargers more sustainable for other electronic consumer products such as laptops, pocket PCs, tablets, PDAs, e-readers, wearable devices, shavers, razors and etc.

One skillful in the art knows that similar techniques may be used in sustainable charger or plugin mechanism of electric cars, cordless drills, cordless vacuums and any other battery dependent machine.

1.2 a New Implementation that Allows Air Circulation to the Case

Figure 3:
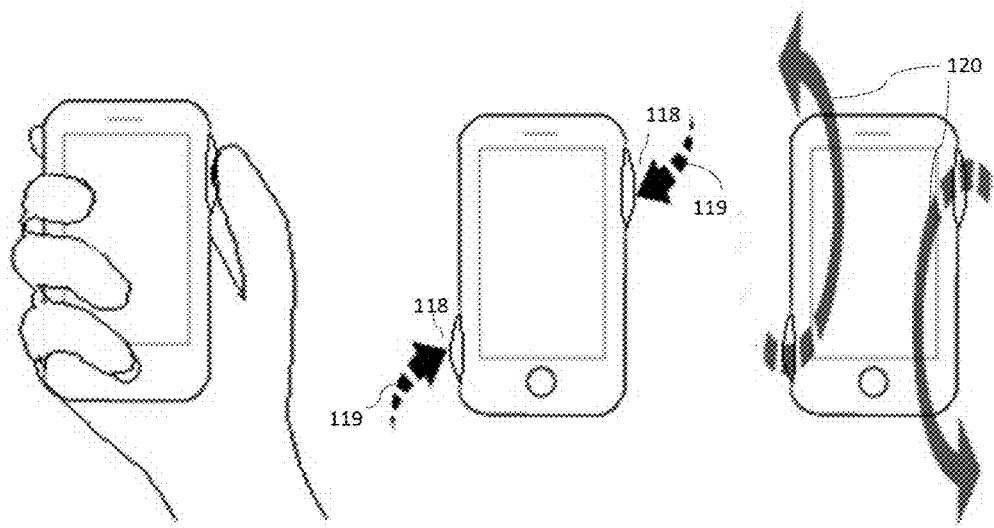
FIG. 3: A squeezable mobile frame that allow air circulation in the mobile case.

In one embodiment, as demonstrated in FIG. 3, a squeezable mobile frame 118 is presented that circulates air 119, 120 into the mobile case and cools down the battery.

2.2.3 a Ventilation System

Figure 4:
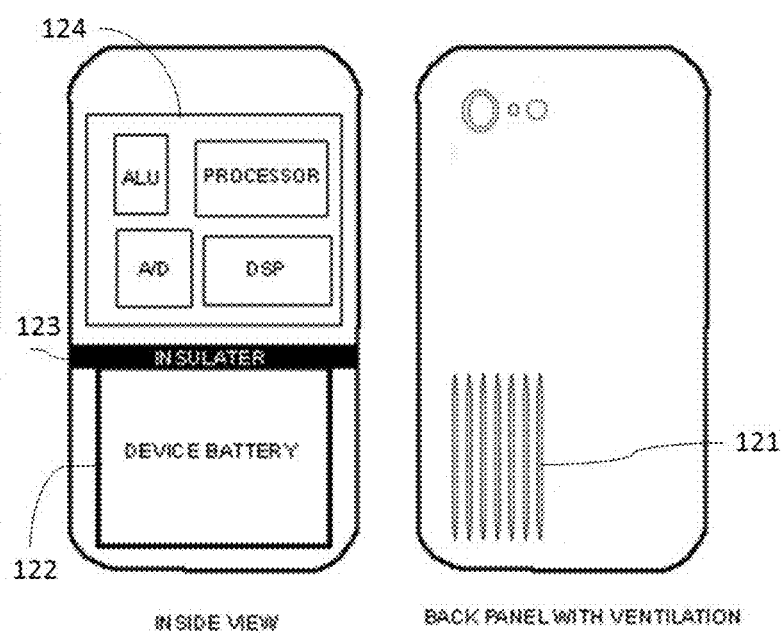
FIG. 4: A ventilation system for the smartphone.

In another embodiment as demonstrated in FIG. 4, a ventilation system is designed that isolate the battery from the electronic board and use a combination of grooved heat sinks. In another design, the body of the smartphone has a perforated surface 121 which allows air to ventilate and cool the battery. A thermal insulator 123 may also be employed to isolate the battery 122 from the electronic processors 124 to prevent heat from passing between them.

One skillful in the art knows that similar apparatus and techniques may be used to improve ventilation inside other electronic devices such as tablets, laptops, pocket PCs, PDAs, e-readers, wearable devices, shavers, razors, and etc.

1.3 an Alerting System to Encourage Sustainable Behavior by the User

Figure 5:
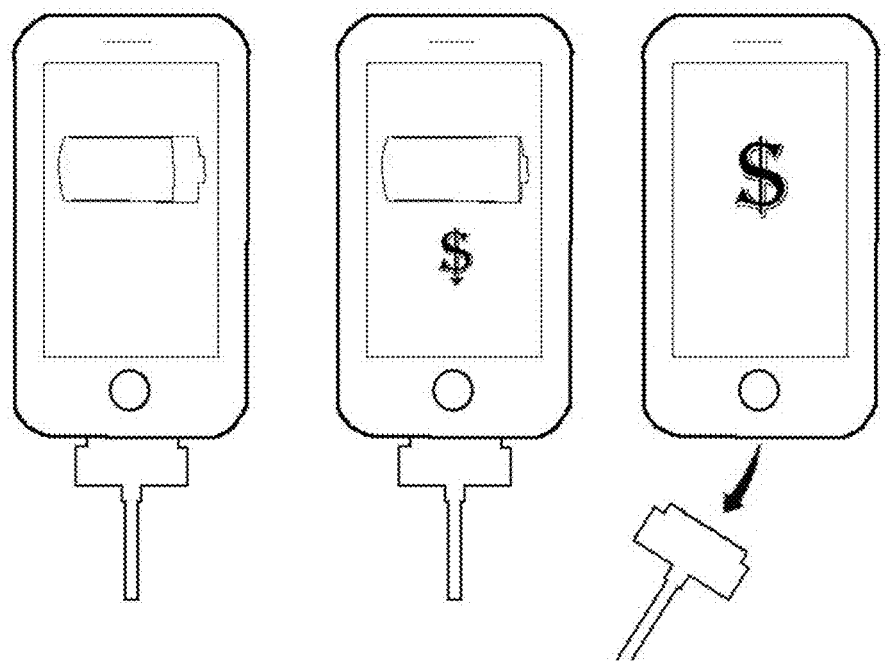
FIG. 5: An alerting system to encourage sustainable behavior by the user.

In addition, some apps and software gadgets may be used in conjunction with temperature sensor(s) located inside or on the surface of the smartphone to alert the user to stop using the device when it gets extremely hot inside (definable through setting a threshold level for the temperature). This system can also be useful for safety purposes to prevent smartphone explosion. Alternatively, an alert system may be employed to encourage sustainable behavior by the user. For example, the system can show a notification that explains the monetary cost of energy being used as shown in FIG. 5.

Moreover, some apps and software gadgets may be used to alert the user to stop charging the device when the battery is over charged.

One skillful in the art knows that similar apparatus and techniques may be used to improve sustainable behavior among the users of other electronic devices such as tablets, laptops, pocket PCs, PDAs, e-readers, personal digital assistants, wearable devices, shavers, razors and etc.

2 Designed Scheme to Minimize Physical Damage

Figure 6:
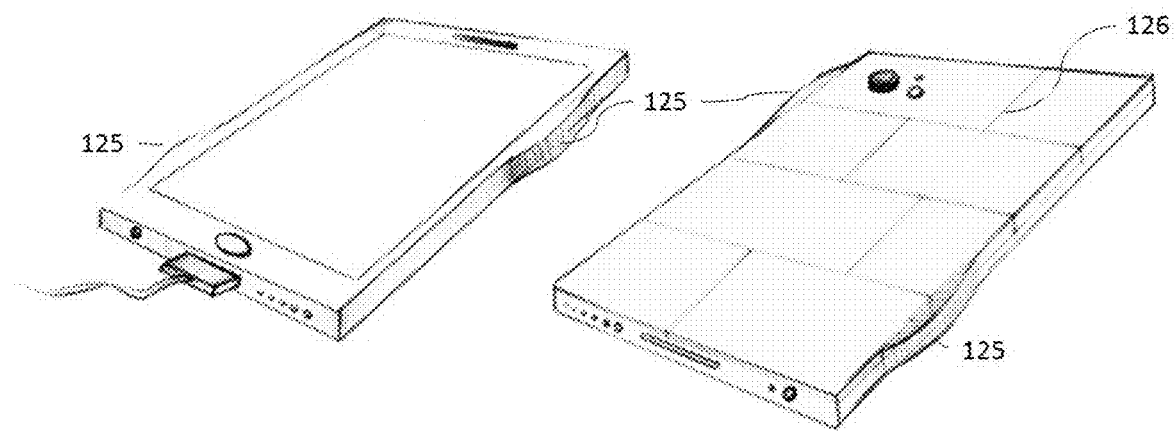
FIG. 6: An easy to grip or slip proof material on the smartphone frame.

In this sub-section, we introduce apparatus and methods to minimize physical damage. The Goal of this design is to protect phone from physical damage, and therefore increasing its lifespan. For example, FIG. 6 shows using an easy to grip 125 or slip proof material 126 on the frame will make it less likely to drop the phone by accident.

3 Designed Schemes to Encourage End of Life Management

Figure 12:
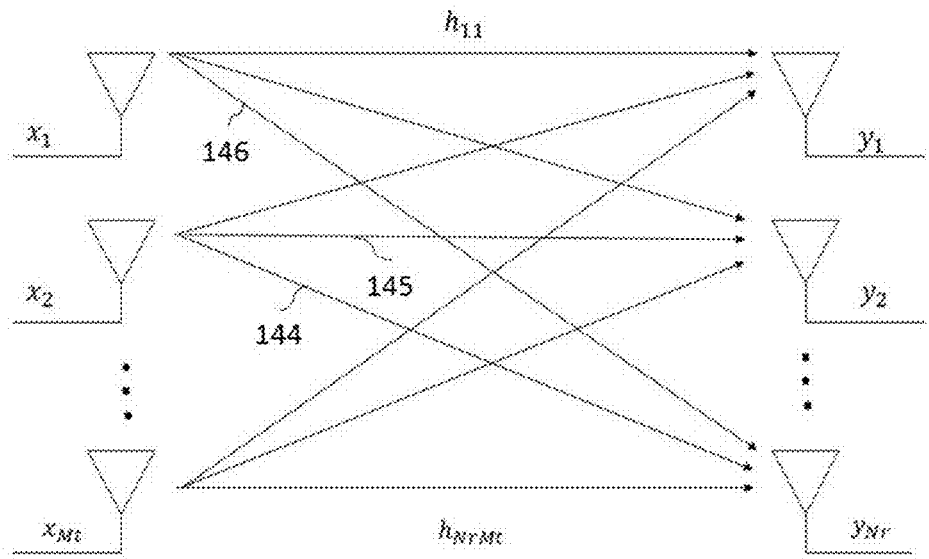
FIG. 12: RSSI matrix calculated for multiple transmitter and receiver antennas.

In this sub-section, we propose apparatus and methods to encourage sustainable end of life management in smartphones. FIG. 12 defines Goal 4 as "Encouraging Sustainable End of Life Management". This figure identifies potential solutions to educate or inform users about where to recycle or potential reuse options. In addition, although the packaging of mobile devices is a delicate issue, people usually lose the retailer box and cannot use it again to return it to manufacturer for repair.

3.1 a Dual Purpose Packaging Scheme

Figure 7:
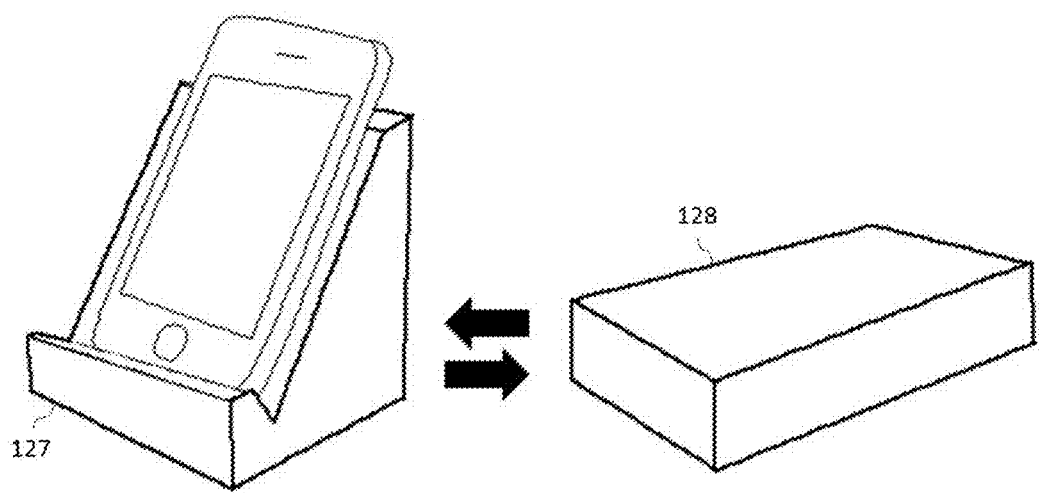
FIG. 7: A dual purpose packaging scheme.

In one embodiment, shown in FIG. 7, a dual purpose packaging scheme is disclosed. In this scheme, the original packaging is designed such that it can be converted to a stand (or base) 127 for the device while the product is in use. This stand is convertible into a mailing package or box 128 later when user decide to send it back to the manufacturer for proper recycling. Needless to say, the original packaging may contain labels which identify the product uniquely (such as S/N) and hence make the recycling much easier. In this design, the package will be folded over to become a stand for the product when it is not in use.

In another embodiment, the original packaging can be designed to be transformable to a passive speaker bass for the phone. In this way, the converted package could be placed on top (or bottom) of the smartphone speaker to make a passive bass. For example, the box can be designed in the right dimension and folded to make a Helmholtz resonator (or universal resonator) which take advantage of air resonant in a cavity to amplify certain frequencies in the sound. In this way, the packaging can be reused to make discrete acoustic filters.

One skillful in the art knows that similar package design could be used to allow dual usage of packaging for other electronic devices such as such as tablets, laptops, pocket PCs, PDAs, e-readers, wearable devices, shavers, razors and etc.

3.2 a Loss and Anti-Theft Prevention System Using Radio Frequency Beacons (or Tags)

Figure 8:
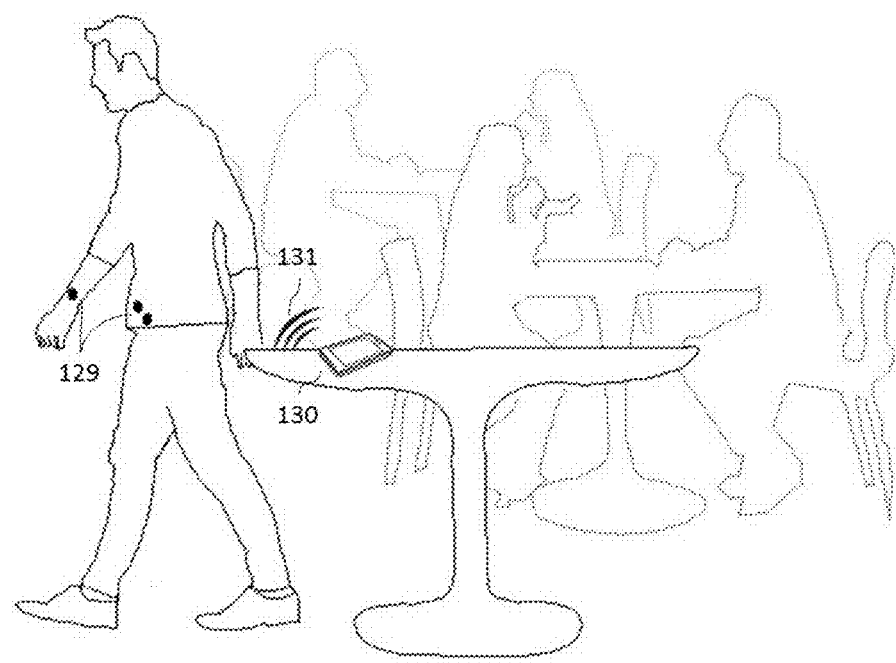
FIG. 8: A loss and anti-theft prevention system for smartphones using radio frequency beacons

In another application, shown in FIG. 8, a loss or anti-theft prevention system using radio frequency beacons is disclosed. The system can alert the smartphone users if they leave their phone or other belongings behind for example in a social gathering or restaurant. The following embodiment can equally be used to localize or track and object/person through one or more localizer units.

In one embodiment, a system introduced which comprises radio frequency tags, tag reader devices, processor unit, single or multiple transmitter antennas, single or multiple receiver antennas. The radio frequency tags could be active or passive RFiD tags, Bluetooth tags, Bluetooth LE tags, Bluetooth beacons or any other radio transmitter whose signal can be read by tag reader.

The tag reader, processor unit and the receiver antenna(s) may be collocated in a smartphone 130. The processor unit may be capable of doing both signal processing and general processing. The tags may optionally be equipped with speaker or microphones.

Alternatively, the system may employ radio frequency beacons and RF receivers instead of radio frequency tags and tag reader device. Each beacon is capable of transmitting a radio frequency. In addition, it might optionally be capable of broadcasting their transmitted power levels or their identity. The receiver might be capable of scanning the radio frequency spectrum to find out the nearby beacons and measure the received signal. The system may also employ single or multiple antennas for the beacons and single or multiple antennas for the receivers.

In addition, if active tags selected for implementation, they may optionally use energy harvesting techniques (for example from a solar or motion energy source), to lengthen the battery life.

One or multiple beacons (or tags) 129 are carried by the user and other beacons (or tags) will be attached to their belongings 138, 139 such as bags, purses, handbags, keys and so on.

The signal from one beacon (or one tag) or group of beacon (or group of tags) worn by the person will be used by RF receiver (or tag reader) and the processor unit (or the smartphone) to estimate the distance of the user from smartphone by analyzing characteristic of the signal received from this beacon or group of beacons (or this tag or group of tags). The beacons (or tags) on the other belongings provide an approximate of how close they are to RF receiver (or the tag reader) and the processor unit. In case the smartphone act as the RF receiver and processor unit (or tag reader and processor unit), the distance will be estimated relative to the smartphone.

A mapping database may be used to extract the distance estimate based on received signal strength indicator (RSSI) from the beacons (or tags) considering the transmit power. That mapping database may be built based on propagation model or empirical experiment.

Alternatively, the distance may be estimated by measuring received signal strength indicator (RSSI) from the RF beacon in the smartphone (or multiple smartphones), normalizing the values with the transmit power of the beacon, querying an RSSI-distance mapping database to estimate the distance of the user from each smartphone (or multiple smartphones).

In an alternative implementation, to reduce the effect of noise and fading a time average of RSSI values would be used to calculate RSSI reference values used to query the distance mapping database. This scheme may be useful to improve the accuracy of the distance estimation.

$$RSSI_{ref} = \underset{t}{\text{Average}} (RSSI_t)$$

Figure 15:
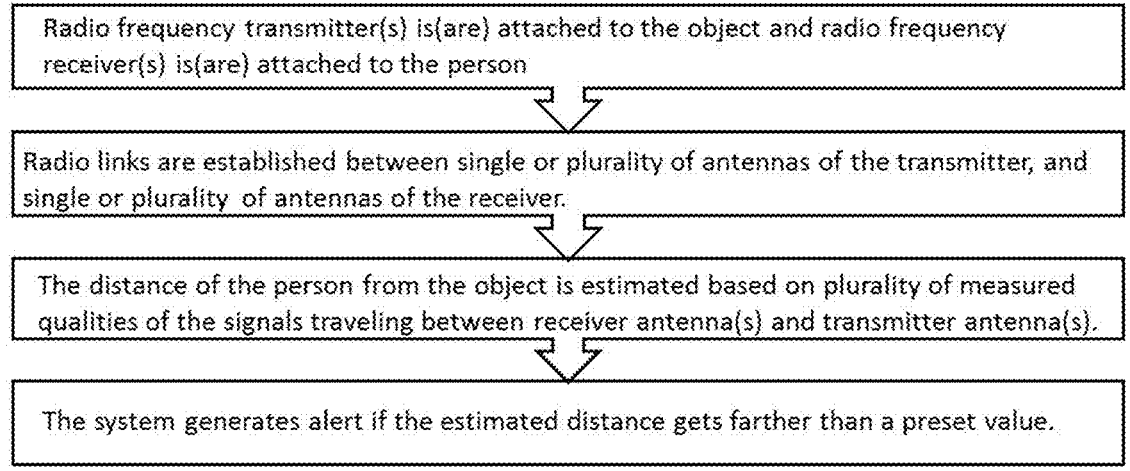
FIG. 15: Mechanism 2 of alerting the loss of an object.
Figure 16:
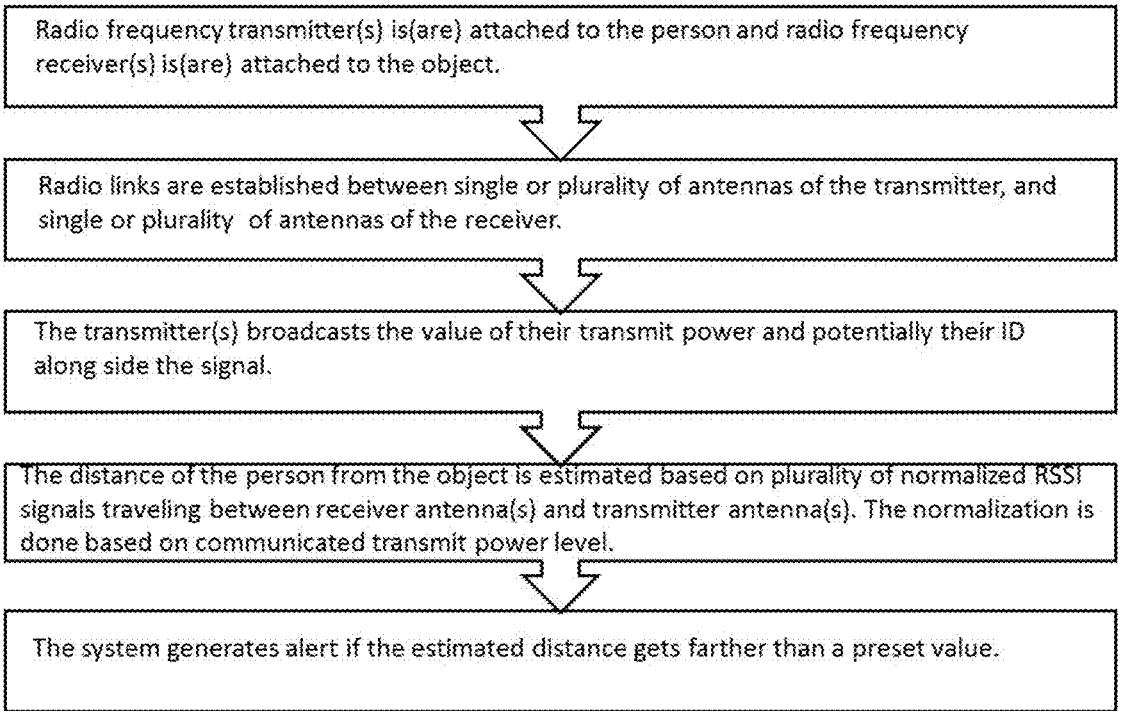
FIG. 16: Mechanism 3 of alerting the loss of an object using normalized RSSI as signal quality.

In an alternative implementation, two or more beacons (or tags) are worn by the user in different part of the body as illustrated in FIGS. 15-16 and a reference RSSI would be calculated from a combination of RSSI values from these beacons (or tags) before querying the RSS I-distance mapping database.

Figure 9:
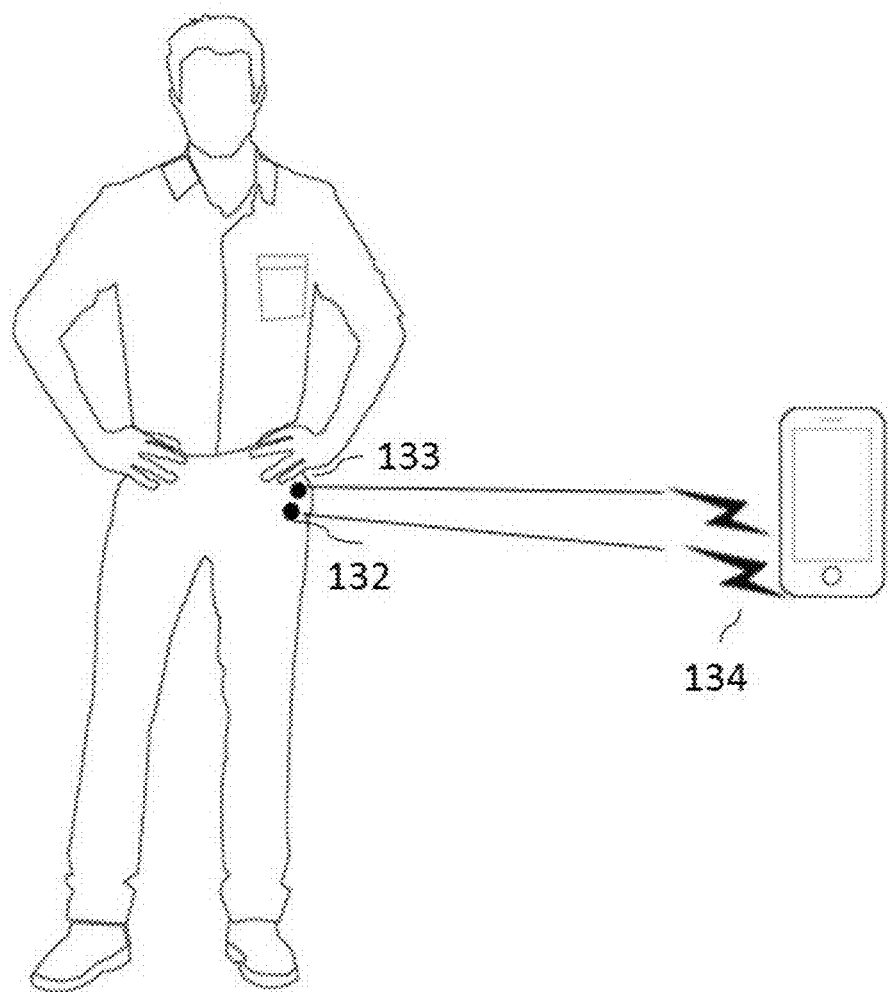
FIG. 9: A distance measurement system employing two co-located beacons.

In one embodiment, two co-located beacons are employed for distance estimation between the person and the object. For example, two beacons (or tags) are worn by the user and they are attached back-to-back 132, 133 (or back-to-front) as illustrated in the FIG. 9. Then, their RSSI values at the smartphone 134 will be used in combination with each other to help reduce the effect of fading and other uncertainties in RSSI for distance estimation. For example, the larger RSSI value from these two could be selected as the reference RSSI to query the mapping database to find corresponding distance.

$$RSSI_{ref} = \max(RSSI_1, RSSI_2)$$

Figure 10:
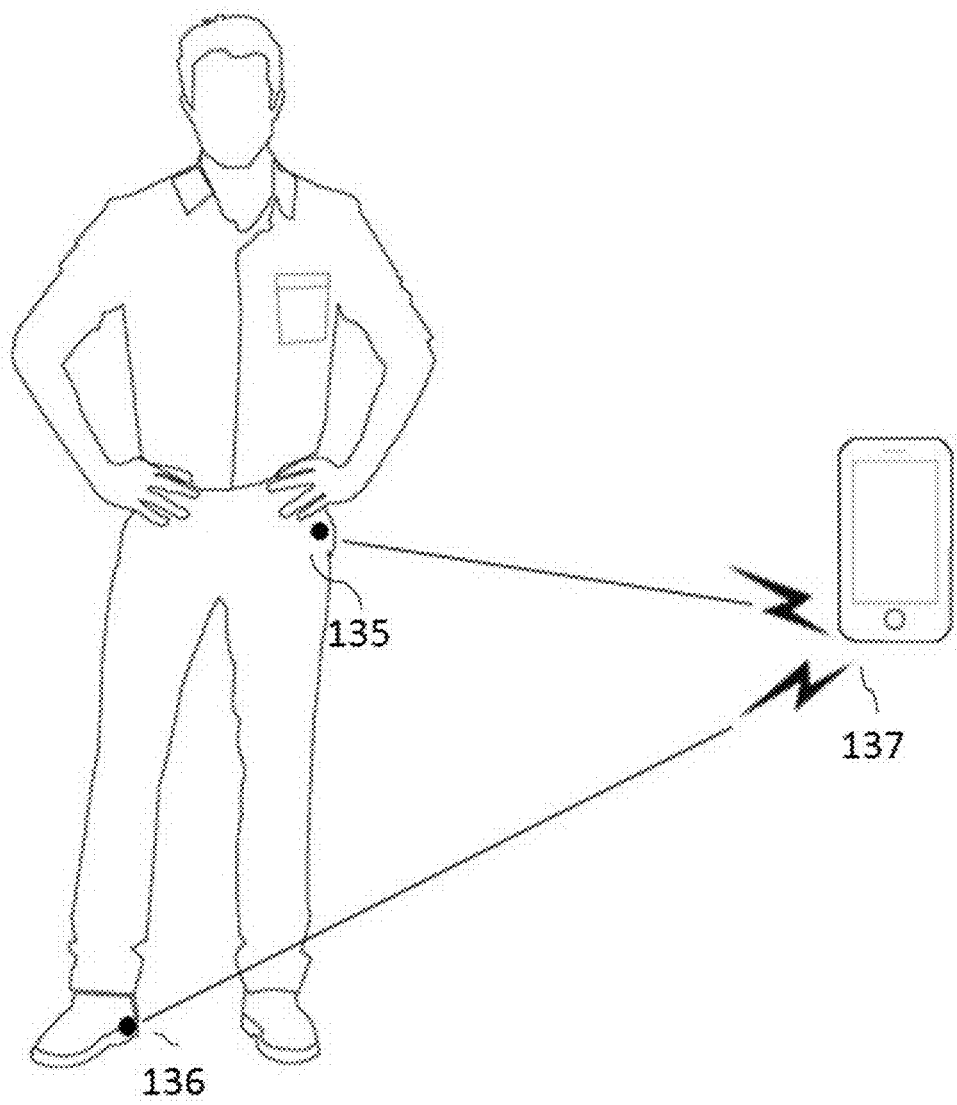
FIG. 10: A distance measurement employing two beacons worn by the user.

Alternatively, two or multiple beacons 135, 136 (or tags) are worn by the user in different part of the body as illustrated in FIG. 10. For example, one can be worn on the users' shoe 136 (either built into the shoe, built into the insole, or attached to the exterior of the shoe) and the other one will be worn as a wrist band or even clipped 135 to the clothes. The more distance between the beacons, the more reliable would be the RSSI reference.

Another formula that can be used to evaluate the reference RSSI from combination of RSSI values (three or more) would be as follows:

$$RSSI_{ref} = \max_i RSSI_i$$

Alternatively, following formula may be employed to derive the reference RSSI $$RSSI_{ref} = \frac{1}{2} * (RSSI_{(n)} + RSSI_{(n-1)})$$

where $RSSI_{(n)}$ and $RSSI_{(n-1)}$ stands for the two largest values among $RSSI_i$ and n is the number of tags. Each of these formulas mitigates the effect of deep fade to some extent. A time average of these reference signals over a specific time period may be used to mitigate the effect of noise and fading even more. For example $$\text{Average\_RSSI}_{ref} = \sum_{k=1}^{n} RSSI_{ref,k}$$

where $RSSI_{ref,k}$ denote the $RSSI_{ref}$ at time $t=t_k$. In this case, Average_$RSSI_{ref}$ would be used for RSSI-distance mapping.

In another embodiment, the smartphone does not count on the RSSI/distance mapping to evaluate the distance of the objects and the user from the mobile-phone but instead ask the user to indicate the threshold RSSI values to distinguish close, mid-range and far distance. This can be done through a set of experiment where user put a tag connected object in a preferred distance which she/he would consider as maximum distance for a closed object and then press a button or select from a drop-down menu to let the smartphone record the RSSI received from the object as the threshold for close distance. She/he may repeat the experiment to let the smartphone decide suitable RSSI threshold levels corresponding to mid-range or far distance. Needless to say that as few as one or as many as needed thresholds may be defined and used depending on the application.

The beacons (or tags) worn by the user will be defined as primary beacons (or primary tags). The software will be programmed such that if the distance of the smartphone and primary beacons (or tags) becomes more than a preset value (or alternatively if the beacons/tags go beyond the close or mid-range distance) both devices start beeping which is an indication that the smartphone is getting far from the user. This mechanism helps to remind the user if they left the smartphone behind. The beeping mechanism may be programmed such that the sound gets softer as the primary beacons (or primary tags) and the smartphone get closer to each other. This helps the user to move in the area and find the location of the smartphone if it is located somewhere out of sight.

In another embodiment, an easy mechanism is used to temporarily disable the beeping feature between the primary beacons (or primary tags) and smartphone for a predefined period of time (that can be selected, for example, from a drop-down menu containing 5, 15, or 30 minutes). That is useful, for example, when the user goes to the bathroom while he/she leaves his/her smartphone and other belongings on the table or with a friend. The system not only provides a mechanism to link the smartphone and the user but also is useful to link secondary beacons (or secondary tags) too. That's because a similar threshold setting mechanism can be used to control the distance of the secondary beacons (or secondary tags) from the smartphone while the primary beacons (or primary tag) is in the vicinity of the smartphone. If the distance of the secondary beacons (or secondary tags) from the phone gets farther from the preset radius, while the smartphone and the primary tags are located close to each other, the smartphone and secondary/primary beacons (or secondary/primary tags) may start beeping again. The beeping mechanism may be programmed such that the sound gets softer as the secondary beacons (or secondary tags) and the smartphone get closer to each other to help finding the secondary tags. In addition, a separate beeping sound may be allocated to each beacon (or tag) in order to differentiate which beacon (or tag) is out of the close ring.

The smartphone acts as a base station for this design where all the signals from each beacon (or tag) can be received and analyzed. If the purpose of loss prevention is not the smartphone itself, then any other smart device, for example smart-watch, tablets, pocket PCs or wearable smart-DSP chips, can be used to receive and analyze (and potentially control) the signals from each beacon (or tag).

Figure 11:
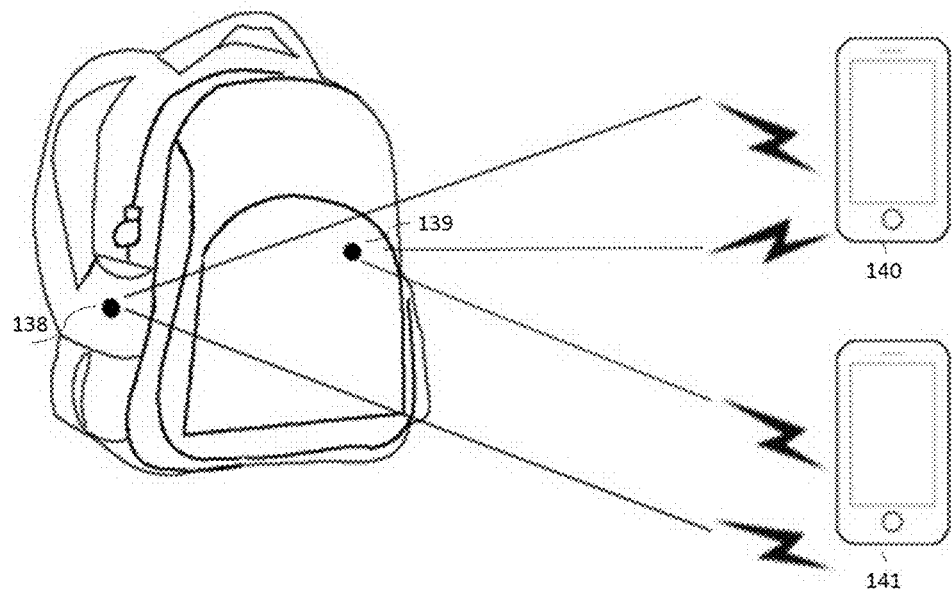
FIG. 11: An object localizer system employing two closely attached beacons and two base-stations (smartphones). The base-stations share data with each other to improve accuracy of location estimation.

In another embodiment, an object localizer system employing two attached beacons and two base-stations (smartphones) are disclosed as illustrated in FIG. 11. In this scheme, if two or more smartphones 140, 141 are available in the same area, they can share their relative locations and the RSSI values from the objects to provide a more reliable estimate of the location of the surrounding beacons 138, 139 (or RF tags) as shown in FIG. 11. This could be done through an approximate trilateration (or multi-lateration) technique or HD-GNSS techniques, which are well-known in GNSS application. In addition, the data may be used to filter unreliable RSSI values. Alternatively, the two smartphones may employ the shared data to find out the orientation of the object toward, or just a better estimate of the distance from, each of them.

It is also possible to design a graphical user interface to illustrate the relative distance of all beacons (or RF tags) from the phone. The GUI may also provide a user-friendly mechanism to define the beacons (or tags) allocated to each object. In case more than two mobile devices are used as a base station and share the data, it is possible to show in what direction the object is from the mobile phone. The software application may use smartphone gyroscope data to update this direction as the user turns the phone.

In another embodiment, the relative distance and location of the tags would be evaluated based on signals transmitted from plurality of transmitter antennas 142 on the RF beacon (or RF tag) to plurality of receiver antennas on the smartphone 143 (or tag reader). For example, the RSSI matrix calculated from each signal traveling between each transmitter and each receiver signal may be used to estimate the distance from the center of transmitter antennas to the center of receiver antennas (FIG. 12). This scheme may be useful on mitigating the effect of fading, noise and other uncertainties on RF signals.

In this scheme, signals from the array of transmitter antennas to array of receiver antennas can be used along with multipath mitigation techniques to increase the accuracy of distance estimation. For this purpose, the more uncorrelated path signals travel between different transmit and receive antenna, the more independent become the fading effect on them. Hence the multipath mitigation techniques or the techniques described above for combining the RSSI measurements to form a reference RSSI measurements becomes more robust. Thus, it improves the accuracy of distance and location estimation by the localizer unit.

In another embodiment of the localization system with multiple antennas in the beacon and receiver sides, transmitter antennas are separated more than half a wavelength of the signal apart. Therefore, fading effect becomes more independent from each other. This type of multipath mitigation is very effective and requires more than one antenna on the transmitter side. The performance of distance estimation in such a scheme, can further be improved by combining with multipath mitigation techniques in the receiver antenna. For example, let us consider a localization scheme illustrated in FIG. 12 with $M_t$ transmit antennas and $N_r$ receive antennas. The reference combined RSSI for distance estimation may be calculated as any of the following formulas where $$RSSI_{ref} = \frac{1}{N_r} \sum_{j=1}^{N_r} \text{Max}_k(RSSI_{k,j})$$

Where $RSSI_{k,j}$ represent the RSSI of the signal traveling from k'th transmit antenna to j'th receive antenna and $\text{Max}_k$ represents maximization over k indexes.

alternatively the reference combined RSSI for distance estimation may be calculated as $$RSSI_{ref} = \text{Max}_k \left( \frac{1}{N_r} \sum_{j=1}^{N_r} (RSSI_{k,j}) \right) \text{ Or}$$

$$RSSI_{ref} = \text{Max}_j \left( \frac{1}{M_t} \sum_{k=1}^{M_t} (RSSI_{k,j}) \right)$$

alternatively the reference combined RSSI for distance estimation may be calculated as $$RSSI_{ref} = \text{Max}_k(\text{Max}_j(RSSI_{k,j}))$$

alternatively the reference combined RSSI for distance estimation may be calculated as $$RSSI_{ref} = \frac{1}{N_r M_t} \sum_{j=1}^{N_r} \sum_{k=1}^{M_t} RSSI_{k,j}$$

alternatively the reference combined RSSI for distance estimation may be calculated as $$RSSI_{ref} = \text{Max}_j \left( \frac{1}{M_t} \sum_{k=1}^{M_t} (RSSI_{k,j}) \right)$$

For example in one embodiment, the signal transmitted from one transmit antenna to a dual polarity receive antenna has a different polarity than the signal transmitted from a second transmit antenna to the said dual polarity receive antenna, Therefore the fading effect would become more independent. In this case, the maximum RSSI from first and second transmit antenna to each receive antenna better represents the ideal signal path loss. Therefore, the distance estimation based on reference RSSI will become more accurate.

Figure 13:
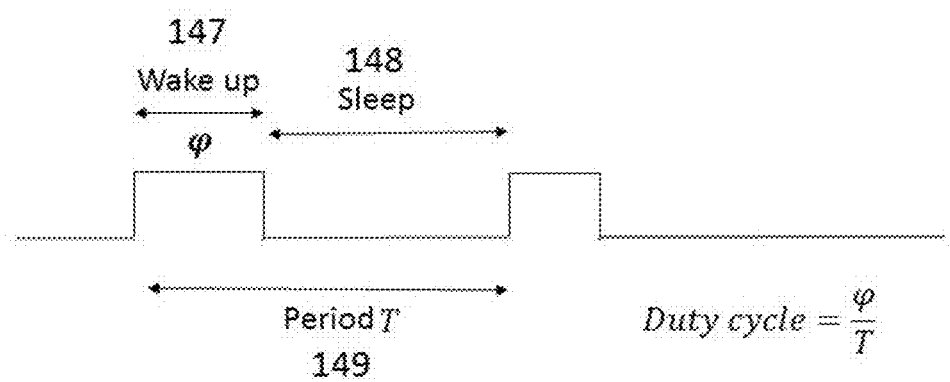
FIG. 13: Wakeup-sleep cycles and relevant parameters.

In one embodiment, the above-mentioned transmitters may become enabled based on an adjustable duty cycle on a periodic basis 149. This helps the smartphone or potential active tags (or beacons), save energy on the sleep cycle 148 as demonstrated in FIG. 13. The duty cycle and period of wakeup-sleep 147, 148 may be adjusted for different type of tags and different energy saving goals. In addition, these parameters may adaptively be controlled through a feedback from the device battery. This may help the battery require less frequent charging.

In another embodiment, the system may employ two different types of tags (or beacons) simultaneously to increase the accuracy of distance measurement.

Figure 14:
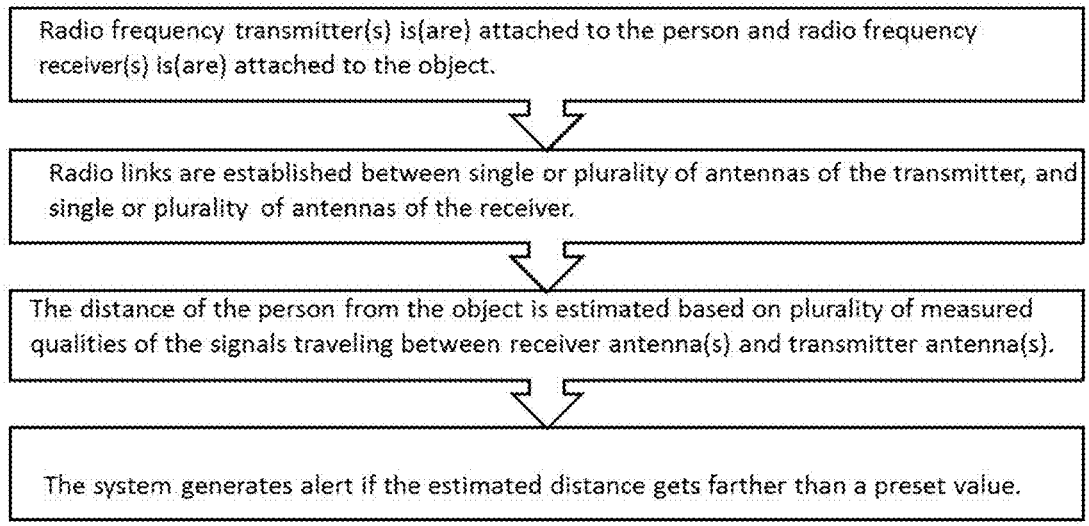
FIG. 14: Mechanism 1 of alerting the loss of an object.

FIGS. 14 and 16 encapsulates two mechanisms of implementing the overall anti-loss alerting system when RF transmitters are attached to the person. In mechanism described in FIG. 16, a normalized RSSI is used to evaluate the quality of the received signal.

Figure 17:
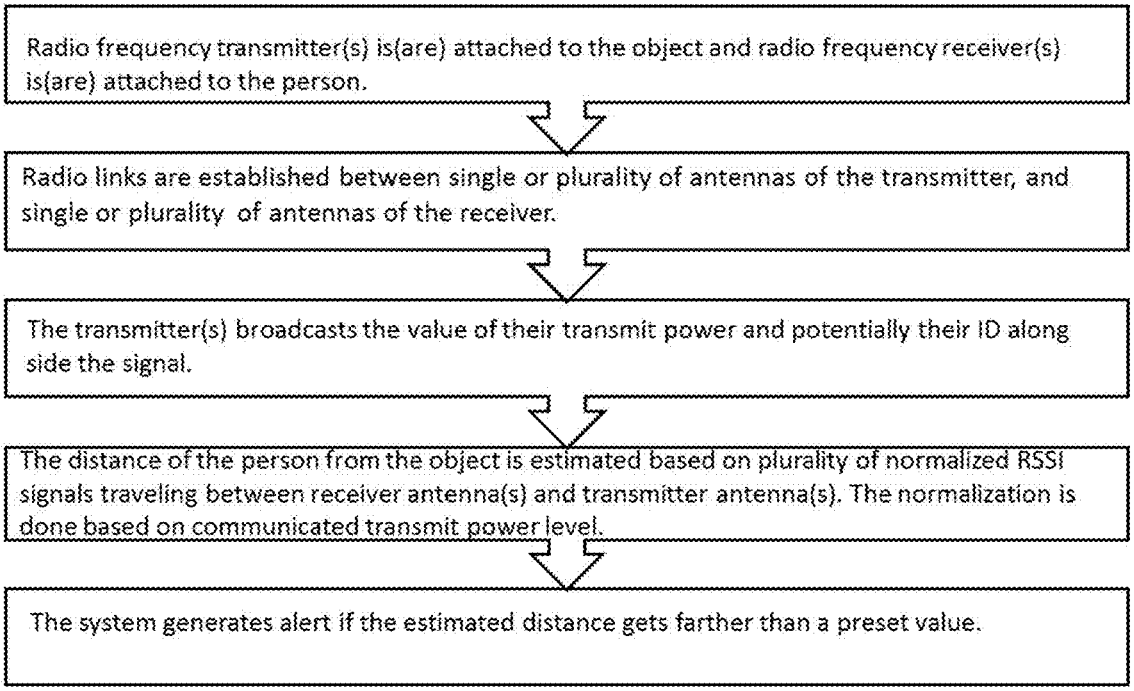
FIG. 17: Mechanism 4 of alerting the loss of an object using normalized RSSI as signal quality.

FIGS. 15 and 17 encapsulates two mechanisms of implementing the overall anti-loss alerting system when RF transmitters are attached to the object or when the smartphone transmit the RF signal. In mechanism described in FIG. 17, a normalized RSSI is used to evaluate the quality of the received signal.

The above-mentioned apparatus and methods can be used for object indoor or outdoor localization or tracking purposes in general. In these types of applications, a localizer unit with signal transmit/receive capability, antenna or multiple antennas and a processor may be used instead of the smart phone. For example, the system can be used for rescuing skiers trapped in an avalanche in a ski resort. In this application, the skier carries one or more beacons attached to her/his body and a localizer can locate the person from transmitting signals passing through the snow. For this application the beacon signals may contain identifying codes allocated specifically to a person's device in addition to a time stamp measured from the last time the reset bottom is hit or from the time the person has fallen which can be indicated by analyzing the data from built in gyroscope/accelerometer to the beacon device. For example, the rapid change of direction of the gyroscope/accelerometer may enable a flag and reset the time stamp.

In another application, similar apparatus or techniques might be used for indoor navigation by a blind person.

Having more than one localizer cooperating in this case in a triangulation or any other sort of localization techniques will help localizing the object/person more rapidly and with a higher accuracy. For this purpose, one localizer should act as a central processing unit and receive the position and distance estimate of other localizer units from the object/person to be localized.

Alternatively, having a beacon/transmitter with an array of antennas and a localizer with multiple antennas will serve the purpose of localization of the target without the need for multiple localizers.

Multiple antennas localization might also be useful when localization is based on measuring the time of arrival or direction of arrival of the signal. These types of localization assume that the speed of travel for the signal in the medium is fixed and known. Therefore, the phase of the received signal can be estimated as $$\phi = \frac{2\pi c \cdot t}{\lambda} \text{ Or } t = \frac{\lambda \cdot \phi}{2\pi c}$$

Where $\phi$, c, $\lambda$ and t represents phase difference of the received signals with respect to each other, speed of the signal propagation in the medium, wavelength and the difference in time of arrival of the signals respectively.

Figure 18:
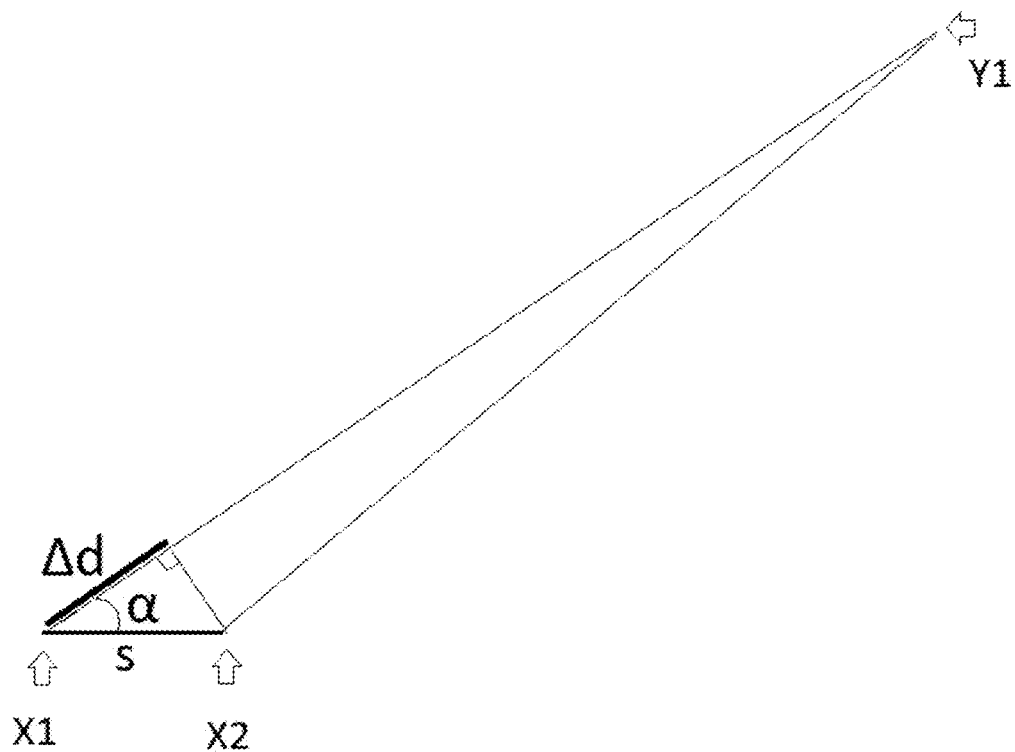
FIG. 18: The difference between wave traveling distance received at one antenna versus the other one.

Similar formula might be used to estimate the direction of arrival of the signal assuming the beacon is located far away from the localizer. In this case as depicted in FIG. 18, the difference between the path of signal traveling from one transmit antenna to two different antennas in the receiver, $\Delta d$, can be estimated as:

$$\Delta d = \text{Cos}(\alpha)s$$

Where α is the receiving direction of the signal from the beacon and s is the separation distance between two receiver antennas. Considering Δd=c·t, thus $$\cos(\alpha) = \frac{c\Delta t}{s} = \frac{\phi\lambda}{s2\pi}$$

Where Δt is the time difference between the signal traveling between the two paths.

From the above equation, to reveal the direction we need to be able to differentiate the time of arrival of the signal from one transmit antenna to two receiver antennas with some accuracy and no ambiguity. Hence the difference in time of arrival should be long enough for the receiver and processor to be able to process and differentiate it. When LOS does not exist, and received signal is the result of dispersion from the objects, usually the difference with time of arrival is not a narrative of the difference of the distance. However, if the line of sight exists between the beacon and the localizer but the signal is distorted, having an array of antennas and using collaborative estimation techniques will help increasing the accuracy by reducing the noise.

In addition, the anticipating estimation techniques such as Kalman filters or extended Kalman filters might be used to improve the direction of arrival and time of arrival estimate based on previous observations.

Figure 19:
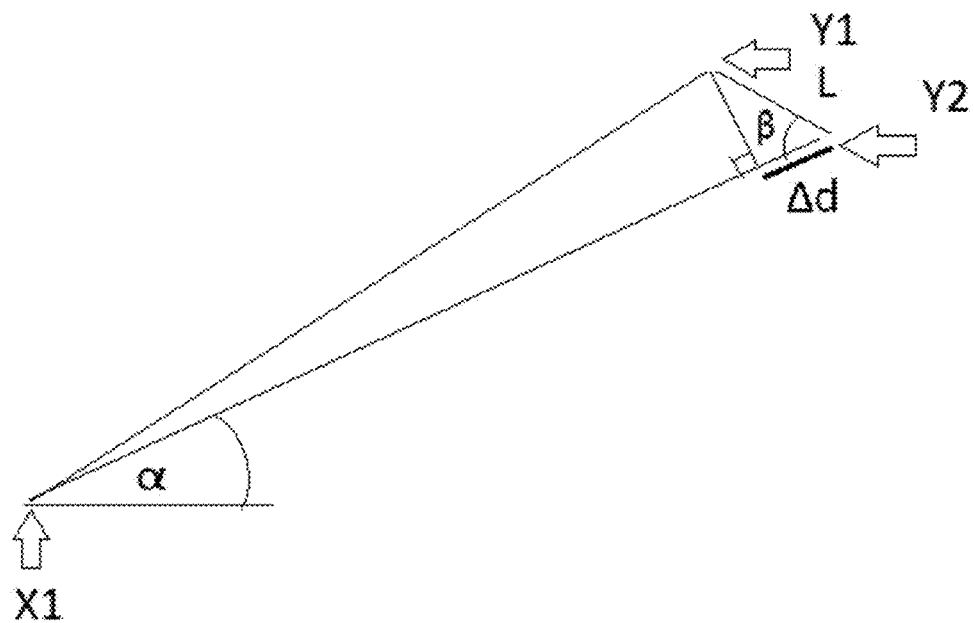
FIG. 19: The difference between wave traveling distance transmitted from two different transmit antennas and received at a receiver antenna.

Similar analysis with the signals arriving from two different transmit antennas at a receiver antenna can reveal the direction of the positioning of the transmit antennas array with respect to receiver antennas array as illustrated in FIG. 19.

Figure 20:
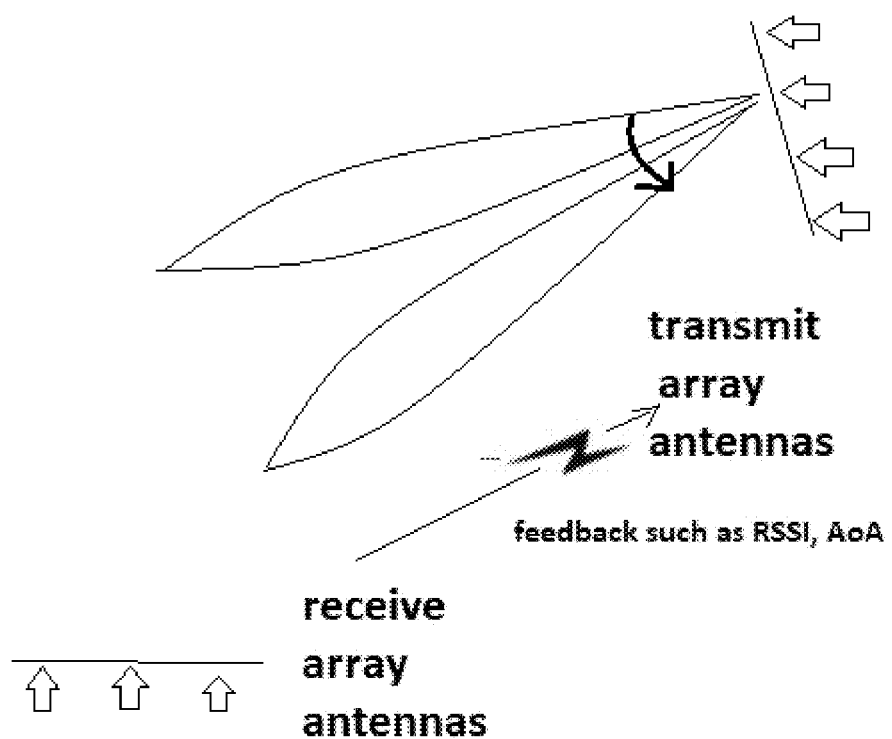
FIG. 20: The cooperative precoding beam forming on the multiple transmit antennas using the indication data from the receiver feedback.
Figure 21:
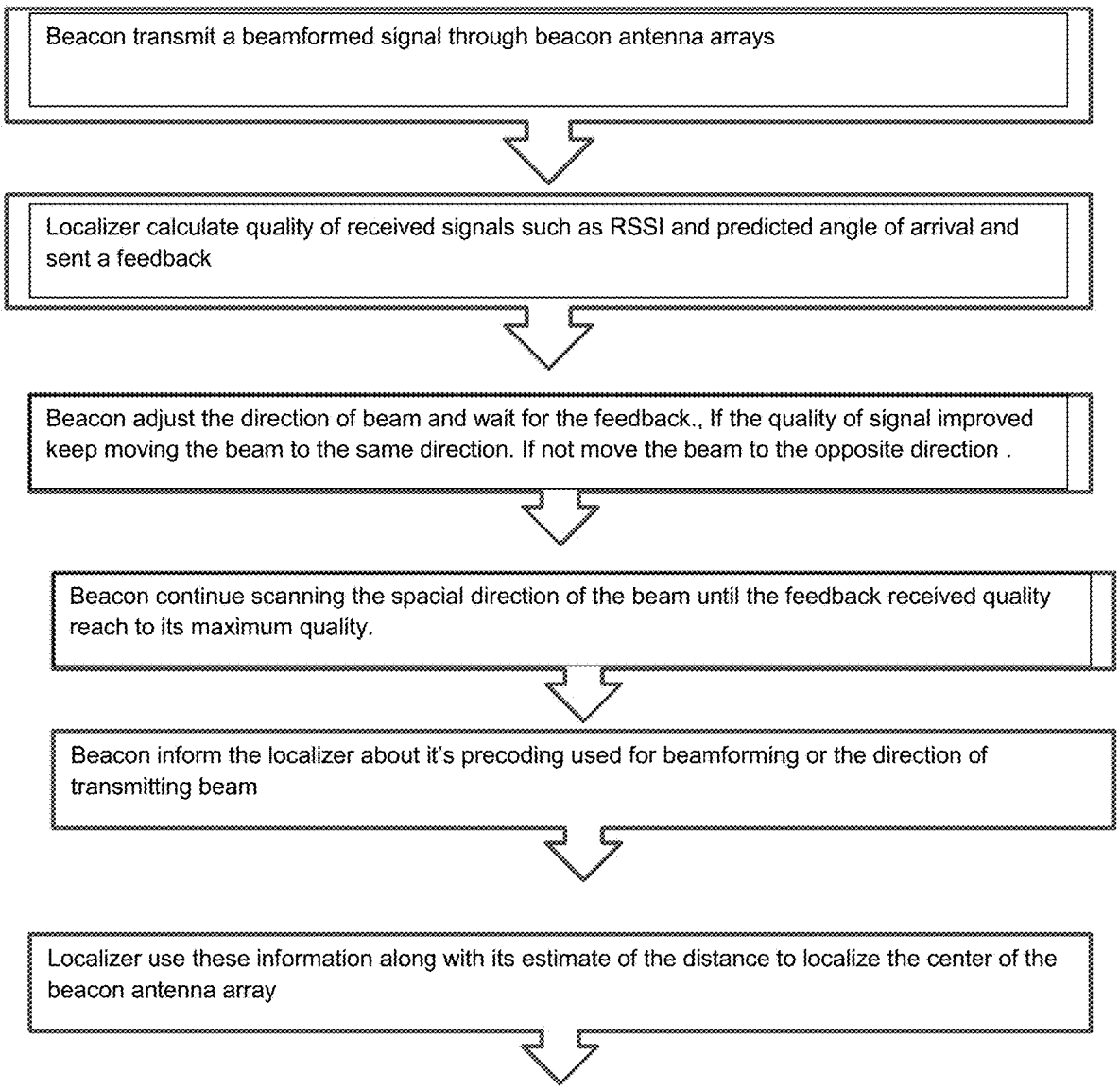
FIG. 21: Iterative combined beam forming and localization scheme.

In one embodiment, when the beacon is cooperating with the localizer to reveal their position, the localizer might ask the transmitter to apply beam forming precoding weights such as to direct the signal toward itself as illustrated in FIGS. 20 and 21. Then the localizer might measure the signal levels at the receiver antenna (or array antennas) and generate a correction on the beam forming precoding weights depending on weather the signal quality or level has improved or not. This process may be done in an iterative way and each time, the estimate of the direction becomes more accurate for both the beacon and the localizer. At the end, when transmitter and receiver get to mutual agreement, the directional position of the beacon and the localizer are revealed for both.

If the localizer uses more than three antennas in an array and each pair of them repeat any of the above procedures, the direction of the beacon will be revealed with respect to middle of each pair of received antennas. Thus, the location of the beacon can be determined using multi-lateration or other estimation techniques. For example, if the localizer can differentiate between the direction of arrival of the signal from each transmitting antenna of the beacon and know the relative positioning of array of transmitting antennas of the beacon (and spatial distance between them) along with similar information for its own array of antennas, it can calculate the location of the center of the beacon with respect to the center of the localizer.

In another embodiment, when the object beacon is cooperating with the localizer to reveal their position and the beacon is capable of beamforming, the beacon might scan the spatial angle and receive feedback from the localizer for example about the RSSI reference measured at the localizer. Then, with an iterative algorithm the beacon may direct the signal more towards the localizer based on the received feedback from the localizer such that to maximize the received power. If the beacon contains a gyroscope, it can now calculate and inform the localizer about the absolute direction in which it is transmitting based on the precoding values of the antenna array. This direction provides an indication about the direction in which the object is located with respect to the localizer. Hence by knowing the distance of the object from itself through any of the methods described above, the localizer device can locate the object completely in space.

All the above-mentioned multiple antenna localization can be used for different type of signal waveform such as RF narrowband signal, ultra-wideband signals (UWB) and sonar signals. However, in the case of RF narrowband signal, RSS based methods are preferred as it does not suffer from ambiguous synchronization and clock inaccuracy. On the other hand, the low frequency and broad bandwidth of the UWB signal allows it to pass the walls and obstacles and provide more accurate time/direction of arrival estimation. Hence, it is more useful for indoor localization.

When measurement of both RSSI and time/direction of arrival is achievable, a hybrid multiple antennas system that use a combination of above-mentioned algorithm can improve the localization/tracking accuracy significantly. For example, a combination of maximum likelihood estimation and Kalman filtering can be used to estimate the distance and the directional positioning of the beacon/target simultaneously.

Moreover, one skillful in the arts knows that similar methods and apparatus can be used to monitor kids' activity in a public environment. In this application, relative location and distance of kids from their parents may be identified using signals transmitted or received from single or plurality of smartphone devices to single or plurality of RF beacons (or RF tags) worn by kids through the above-mentioned techniques.

One skillful in the art knows that the above-mentioned techniques may also be employed using any wearable device capable of transmitting an RF signal or reading an RF beacon (or RF tag) instead of an smartphone. These wearable devices include but not limited to smart watches, wearable DSP processors and so on. In addition, the same techniques may be applied on tablets, PDAs, e-readers, wearable devices, or pocket PCs to prevent leaving them behind or to localize objects around them.

One skillful in the arts knows that the above-mentioned methods and apparatus may be used for any indoor or dense urban localization and tracking where signal from satellite is either not available or does not provide any accurate estimate. The localization may be done through for example measuring received signal strength indicator (RSSI) of the RF beacon in multiple fixed base stations installed around the facility (or multiple smartphones), normalizing the values with the transmit power of the beacon, querying an RSSI-distance mapping database to estimate the distance of the user from each fixed base station (or multiple smartphones), and using a trilateration/multi-lateration techniques. In addition, in the case that smartphones or basestation take benefit from multiple antennas, the direction of arrivals techniques may be employed to find out the location of the objects attached to beacons (or RF tags). Therefore, the application is included but not limited to theft prevention systems in retail stores, lost object tracking, children safety watching, staff tracking and so on.

One skillful in the arts knows that before-mentioned techniques for distance measurements and localization through measuring RF signals traveling between smartphone and RF devices attached to the target object, can be implemented similarly if smartphone transmits the RF signals and the signal is measured at RF receivers attached to the object. In addition, the accuracy of distance mapping can be increased if combination of RSSIs from multiple antennas on the receiver side (or equally a combination of RSSIs from multiple antennas in the transmitter or multiple antennas in both sides) is employed.

One skillful in the arts knows that the same techniques and methods may be employed using acoustic or sonar transmitters and receivers instead of radio frequency beacons and receivers for loss and theft prevention.

Although some elements and features of this disclosure are described in specific combinations or might seem complimentary to each other, one skillful in the art knows that each element or feature can be utilized alone or in a different combination with others. In addition, the methods described above may be used by any other consumer electronics devices.

What is claimed is:

1. A localization system for localization of an object, said system comprising:
at least one beacon disposed at a location, said at least one beacon comprising a plurality of antennas, each antenna adapted to transmit one radio frequency (RF) signal, wherein said at least one beacon is configured to be attached to the object; and
a localizer device comprising at least two antennas and said localizer device is configured to receive said RF signals from said plurality of antennas of said at least one beacon via said at least two antennas of said localizer device and said localizer device is configured to estimate a distance between the object and said localizer device based on a plurality of received signal strength indicators (RSSI) of said radio frequency (RF) signals transmitted from said plurality of antennas of said at least one beacon and said RF signals measured at said at least two antennas of said localizer device to yield the location of the object,
wherein at least two of said plurality of RSSIs are originated from two distinct antennas of said at least one beacon, said RSSIs measured at one of said at least two antennas of said localizer device;
wherein a reference combined RSSI is used to estimate the distance between the object and said localizer device; and
wherein said reference combined RSSI is calculated by following equation:

$$RSSI_{ref} = \frac{1}{N_r} \sum_{j=1}^{N_r} \text{Max}_k(RSSI_{k,j})$$

where $N_r$ represents number of antennas of the localizer; and $RSSI_{k,j}$ represents an RSSI of a signal traveling from $k^{th}$ transmitting antenna of the beacon to $j^{th}$ antenna of the localizer and $\text{Max}_k$ represents maximization over k indexes.

2. The system of claim 1, wherein at least two of said plurality of received signal strength indicators (RSSI) are originated from two distinct antennas of said at least one beacon and measured at said at least two antennas of said localizer device.

3. The system of claim 1, wherein at least two radio frequency (RF) signals transmitted from said at least one beacon via said plurality of antennas have different polarities; and
wherein between RSSIs measured from signals from with different polarities.

4. The system of claim 1, wherein a maximum of said at least two of said plurality of RSSIs
is used to estimate the distance between the object and said mobile localizer device.

5. The system of claim 1, wherein said localizer device is configured to produce a notification when said distance exceeds a threshold.

6. The system of claim 1, wherein said localizer device further comprises a plurality of antennas; and
wherein said localizer device calculates an RSSI value for each signal path between each of said plurality of transmitting antennas attached to said at least one beacon and each of said plurality of receiving antennas attached to said localizer device; and
wherein the localizer device calculates maximum value of all RSSIs originated from each said transmitting antenna over all said plurality of received antennas, and then average the maximum RSSI values corresponding to all transmitting antennas in order to derive a combined reference RSSI; and
wherein the localizer device use said derived reference RSSI for distance, estimation in order to increase the accuracy of said distance estimation.

7. The localization system of claim 1 wherein,
Said at least one beacon, comprising a plurality of antennas is capable of beamforming and receive feedback from said localizer device regarding one quality of signals received at said localizer device, and
Wherein said at least one beacon adapt a precoding for beamforming scheme based on a received feedback from the said localizer through an iterative algorithm such that the beacon's beam is directed towards said localizer device,
Wherein the at least one beacon provide an information about which direction the beacon's beam is aligned with to said localizer device, and
Wherein the localizer device uses said information about the direction of said beam along with the distance estimation calculated by the localizer to fully identify the location of the object with respect to the localizer.

8. The system of claim 1, further comprising at least one speaker functionally couple to said localizer device, wherein said at least one speaker is configured to selectively generate an alarm.

9. The system of claim 8, wherein the alarm sounds softer as said at least one beacon gets closer to the localizer device.

10. The system of claim 1, wherein said at least one beacon comprises a low energy Bluetooth RF tag.

11. The system of claim 1, wherein said at least one beacon is configured to periodically transmit on a configurable wakeup cycle.

12. The system of claim 1, wherein said localizer device is a smartphone.

13. The system of claim 7, wherein said at least one beacon transmit an ultra-wideband signal.

14. A localization system for localization of an object, said system comprising:
at least one beacon disposed at a location, said at least one beacon comprising a plurality of antennas, each antenna adapted to transmit one radio frequency (RF)

signal, wherein said at least one beacon is configured to be attached to the object; and a localizer device comprising at least two antennas and said localizer device is configured to receive said RF signals from said plurality of antennas of said at least one beacon via said at least two antennas of said localizer device and said localizer device is configured to estimate a distance between the object and said localizer device based on a plurality of received signal strength indicators (RSSI) of said radio frequency (RF) signals transmitted from said plurality of antennas of said at least one beacon and said RF signals measured at said at least two antennas of said localizer device to yield the location of the object, wherein at least two of said plurality of RSSIs are originated from two distinct antennas of said at least one beacon, said RSSIs measured at one of said at least two antennas of said localizer device;

wherein a reference combined RSSI is used to estimate the distance between the object and said localizer device; and wherein said reference combined RSSI is calculated by following equation:

$$RSSI_{ref} = \text{Max}_k \left( \frac{1}{N_r} \sum_{j=1}^{N_r} (RSSI_{k,j}) \right)$$

where $N_r$ represents number of antennas of the localizer; and $RSSI_{k,j}$ represents an RSSI of a signal traveling from $k^{th}$ transmitting antenna of the beacon to $j^{th}$ antenna of the localizer and $\text{Max}_k$ represents maximization over k indexes.

15. A localization system for localization of an object, said system comprising:

at least one beacon disposed at a location, said at least one beacon comprising a plurality of antennas, each antenna adapted to transmit one radio frequency (RF) signal, wherein said at least one beacon is configured to be attached to the object; and a localizer device comprising at least two antennas and said localizer device is configured to receive said RF signals from said plurality of antennas of said at least one beacon via said at least two antennas of said localizer device and said localizer device is configured to estimate a distance between the object and said localizer device based on a plurality of received signal strength indicators (RSSI) of said radio frequency (RF) signals transmitted from said plurality of antennas of said at least one beacon and said RF signals measured at said at least two antennas of said localizer device to yield the location of the object, wherein at least two of said plurality of RSSIs are originated from two distinct antennas of said at least one beacon, said RSSIs measured at one of said at least two antennas of said localizer device;

wherein a reference combined RSSI is used to estimate the distance between the object and said localizer device; and wherein said reference combined RSSI is calculated by following equation:

$$RSSI_{ref} = \text{Max}_j \left( \frac{1}{M_t} \sum_{k=1}^{M_t} (RSSI_{k,j}) \right)$$

where $M_t$ represents number of transmitting antennas of the beacon, $RSSI_{k,j}$ represents an RSSI of a signal traveling from $k^{th}$ transmitting antenna of the beacon to $j^{th}$ antenna of the localizer, and $\text{Max}_j$ represents maximization over j indexes.

\* \* \* \* \*